Nov. 6, 1928.  1,690,282
F. E. DENNISON ET AL
FILTER AND METHOD OF MAKING
Filed Jan. 29, 1926
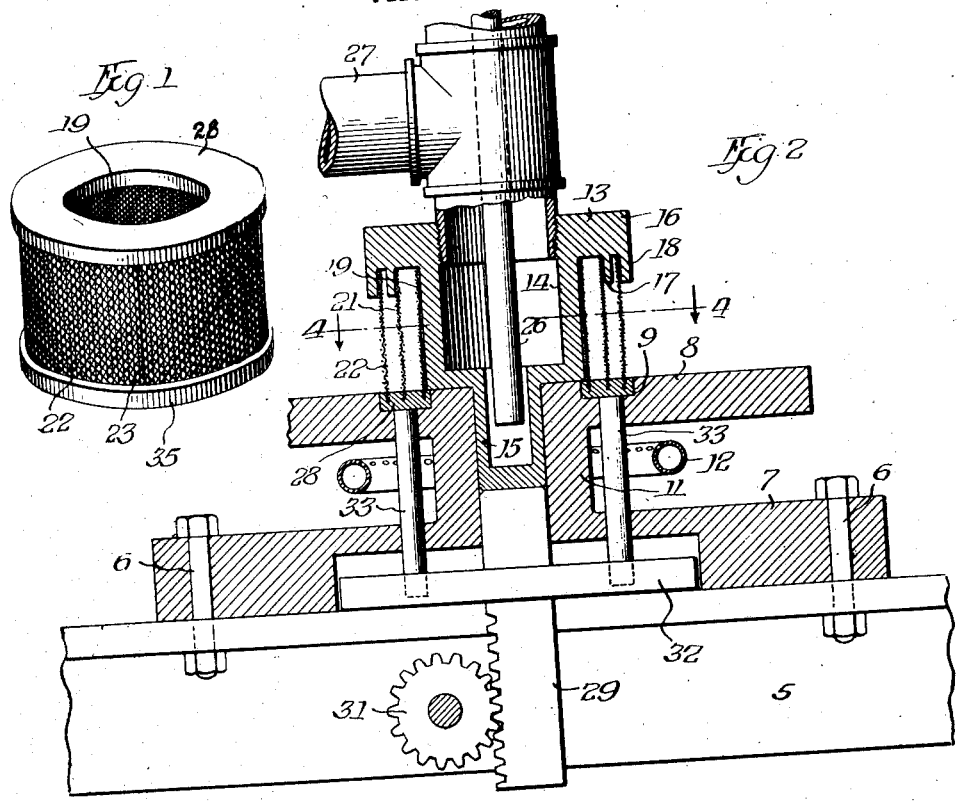
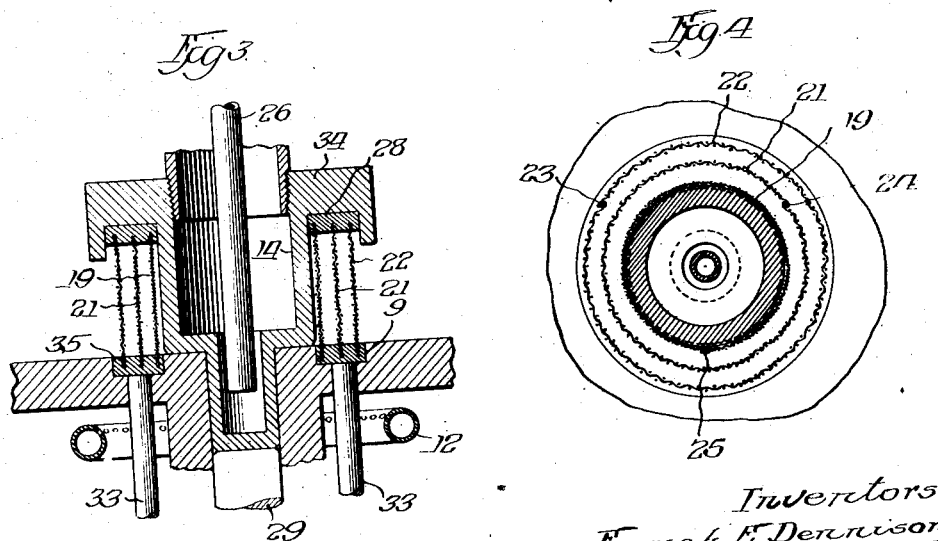
Inventors:
French E. Dennison
Ward S. Ireland Patented Nov. 6, 1928.

1,690,282

UNITED STATES PATENT OFFICE.

FRENCH E. DENNISON AND WARD S. IRELAND, OF BELOIT, WISCONSIN, ASSIGNORS TO NATIONAL REFRIGERATION CORPORATION, OF BELOIT, WISCONSIN, A CORPORATION OF DELAWARE.

FILTER AND METHOD OF MAKING.

Application filed January 29, 1926. Serial No. 84,574.

This invention pertains generally to filters and specifically to filters of the character adapted for use in a mechanical refrigeration system for the purpose of preventing dirt, sediment, scale, and solid particles of various kinds from obtaining access to the expansion valve or compressor. Our invention may, however, be utilized for many other analogous purposes.

One of the objects of our invention is to provide a filter which will effectually screen out solid particles from fluid flowing therethrough, and which will present a maximum area of screening surface, so that the liability of its becoming clogged or stopped up is reduced to a minimum.

Another object of the invention is to provide a filter which will not be liable to leak, but which will be strong and substantial in construction and durable in operation.

A further object is the provision of a novel and a practical method for the manufacture of our novel filter.

In order to facilitate an understanding of our invention, we have shown on the accompanying drawings a preferred embodiment thereof, from which, when considered in connection with the following description, the invention and many of its inherent advantages should be readily appreciated.

Referring to the drawings:

Fig. 1 is a perspective view of a filter embodying our invention,

Fig. 2 is a vertical sectional view illustrating one step in the manufacture of our filter, Fig. 3 is a similar fragmentary view showing another step in the manufacture, and Fig. 4 is a sectional view on the line 4—4 of Fig. 2.

Referring to the drawings more in detail, reference character 5 indicates generally a table bench or frame utilized in the manufacture of our improved filter and upon which is secured by bolts 6, or otherwise, the base 7 of a mold consisting of a disc or plate 8 provided with an annular recess 9 and supported upon a hollow neck or standard 11. The recess 9 forms the mold proper into which the molten metal forming the ends of our improved filter is poured. In order to prevent the metal from chilling or hardening when poured into the mold, a burner 12 is located immediately beneath the same so as to maintain the requisite temperature thereof.

With the mold is adapted to cooperate a form generally indicated by reference character 13, comprising a hollow body portion 14 provided with a hollow extension 15 at one end and a radial flange 16 at its opposite end equipped with two depending annular flanges 17 and 18 respectively. This form when removed from the mold is adapted to receive the screen elements embodied in the structure of our improved filter. While any preferred number of screen elements may be employed, I have shown for purposes of illustration, three of such elements, the inner one being indicated by reference character 19, the intermediate one by 21, and the outer one by 22. These screen elements are made of fine wire woven into a fine mesh fabric and preferably the fabrics are of increasing fineness of mesh from the outside to the interior of the filter, that is the outer screen 22 has the coarsest mesh, the inner screen 19, the finest, and the screen 21, an intermediate mesh. These screens are cut to the proper length and the ends of each are joined by a double seam, so as to form a solderless joint. It will be observed from Fig. 4 that the screen joints indicated by reference characters 23, 24 and 25 respectively, are so distributed in the assembled filter that they offer minimum resistance to the flow of fluids through the filter.

The form 13 having been removed from the mold, the screen elements are assembled thereon as shown in Figs. 2 and 3. Element 19 slips over and loosely embraces the body portion 14 of the form. Element 21 is embraced at its upper end by the flange 17, and element 22 is similarly embraced at its upper end by the flange 18. The mold recess 9 is now filled with the molten metal, whereupon the form is positioned as shown in Fig. 2 to project the lower ends of all of the screen elements into the molten metal as shown.

For the purpose of hastening the cooling of the mold, cold water is now introduced into the form through a cold water pipe 26 extending downwardly into the extension 15. This water will cool the form and the surrounding mold, thus hastening the hardening of the metal. The water overflows from the form and is discharged through an overflow pipe 27.

When the mold has been sufficiently cooled, the form is lifted and the metal ring or filter end 28 is ejected from the mold in the following manner: A rack bar 29, extending downwardly through the frame adapted to be actuated by a pinion 31 which may be operated by a crank, is moved upwardly against the lower end of the projection 15 to thereby elevate the form. A cross-head 32, carried by the rack bar is provided with a plurality of ejector pins 33, the upper ends of which normally lie flush with the bottom of the mold recess 9. Upward movement of the rack bar and cross-head moves the ejector pins upwardly to eject the cast ring 28 from the mold. When the ring has been freed from the mold, the screens may be withdrawn from the form and placed on another form 34, shown in Fig. 3. The mold recess 9 is again filled with molten metal, whereupon the form 34 is lowered to introduce the lower ends of the screened members into the metal as shown in Fig. 3. Cold water is then introduced again through the pipe 26 to cool the metal, whereupon it is ejected, thus completing the filter which consists of the three screen elements previously mentioned, the top ring 28 and the bottom ring 35.

It will be observed that the ends of the screen elements are firmly embedded and cast into the top and bottom rings 28 and 35, so that the spaces between the screen elements are effectually sealed and any leakage around the ends of the elements is precluded. The filter comprising the three screens with the integral top and bottom rings, forms a complete unit which may be assembled in an expansion valve or any other apparatus, so that the fluid to be filtered must pass through the successive screens of the filter from the outside toward the inside. If the filter is clamped in position in a chamber to which the unfiltered fluid is delivered, the fluid, after passing through the screens will be discharged from a point centrally of the filter.

The details of construction of the filter and the various steps utilized in its manufacture may obviously be varied within considerable limits without departing from the spirit of the invention as set forth in the following claims.

We claim:

1. A filter comprising a plurality of cylindrical screen elements arranged in spaced relation and of a decreasingly finer mesh from the outside to the inside, and a member fused to one end of the elements for sealing the spaces between them at said end and uniting the said elements.

2. A filter comprising a plurality of concentrically arranged cylindrical screens, and end members cast upon the end margins of said screens, uniting the same into a unitary structure and closing the ends of the spaces between the screens.

3. A filter comprising a plurality of concentrically arranged screens of different diameters having their ends connected by metal cast upon the end margins of the screen.

4. A filter comprising a plurality of concentrically arranged cylindrical screens of decreasingly finer mesh from the outside toward the inside, and cast metal end rings into which the end margins of said screens project and to which they are secured by the solidifying of the rings whereby a unitary structure is produced.

5. A filter comprising a plurality of screen elements arranged in juxtaposed spaced relation and a member fused to one end of the elements for sealing the spaces between them at said end and uniting the said elements.

6. A filter comprising a plurality of screen elements arranged in juxtaposed spaced relation and a member moulded to one end of the elements for sealing the spaces between them at said end and uniting the said elements.

FRENCH E. DENNISON.
WARD S. IRELAND.